Oct. 6, 1953 — E. R. PRICE — 2,654,224
POWER-OPERATED HYDRAULIC ACTUATOR
Filed Sept. 27, 1950 — 2 Sheets-Sheet 1

INVENTOR.
EARL R. PRICE
BY
ATTORNEY

Oct. 6, 1953  E. R. PRICE  2,654,224
POWER-OPERATED HYDRAULIC ACTUATOR
Filed Sept. 27, 1950  2 Sheets-Sheet 2

INVENTOR.
EARL R. PRICE
BY
ATTORNEY

Patented Oct. 6, 1953

2,654,224

UNITED STATES PATENT OFFICE 2,654,224

POWER-OPERATED HYDRAULIC ACTUATOR

Earl R. Price, South Bend, Ind., assignor to Bendix Aviation Corporation, South Bend, Ind., a corporation of Delaware Application September 27, 1950, Serial No. 186,990

16 Claims. (Cl. 60—54.6)

The present invention relates to a power operated hydraulic pressure device in which differential air pressure is utilized through a pressure transfer mechanism to produce hydraulic pressure.

The primary object of the present invention is to improve and simplify the construction of a power operated hydraulic actuator while simultaneously reducing the expense of fabricating the same.

Another object is to provide a power operated slave cylinder with a piston which may shift transversely in the slave cylinder bore, during actuation, to compensate for any eccentricities between the power unit and said bore, said piston being simple in design, economical to manufacture, and reliable in operation.

Another object is to provide a simple valve arrangement for the slave cylinder piston which serves as a liquid-compensating device for a connected hydraulic system and which acts as the operative connection between the power unit and said piston.

Other objects will become apparent as the description proceeds.

Figure 1:
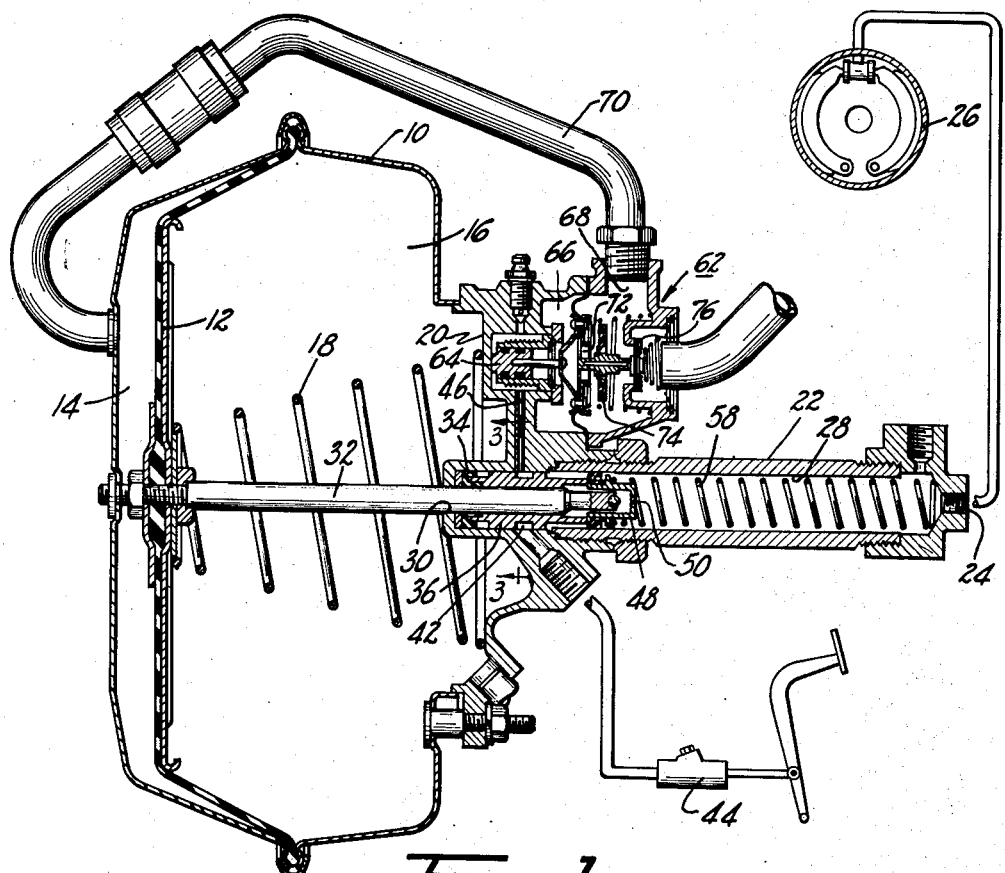
Figure 1 is a longitudinal section of an embodiment of the present invention, with connections to a vehicle brake and manually operated master cylinder being shown in diagram.
Figure 2:
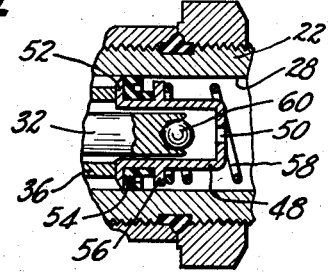
Figure 2 is an enlargement of the piston construction of the slave cylinder of Figure 1.

Referring to the drawings, and more particularly to Figures 1 and 2, the power unit comprises a housing 10 and a diaphragm, or fluid pressure responsive member 12 reciprocable therein which defines variable volume chambers 14 and 16. The diaphragm 12 is maintained in the illustrated released position by means of a frustoconical compression spring 18 which bears against end wall 20 of housing 10. The hydraulic slave cylinder 22, which is operated by said power unit, is secured to the central portion of end wall 20 to extend outwardly therefrom, and is connected through port 24 to a vehicle brake assembly 26. The bore 28 of slave cylinder 22 is formed with its axis collinear with that of an opening 30 in end wall 20. A push rod 32 is suitably secured at one end to the center of diaphragm 12 and is reciprocably received through opening 30 to extend into the bore 28.

In order to prevent fluid communication between chamber 16 of housing 10 and the bore 28 of cylinder 22, an annular sealing member 34 is positioned between rod 32 and opening 30.

Figure 3:
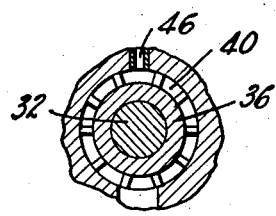
Figure 3 is a fragmental transverse section taken substantially on section line 3—3 of Figure 1 showing the guide bearing construction.

Guiding of the push rod 32 in slave cylinder bore 28 is accomplished by the use of a tubular bearing 36 concentrically received in bore 28. As is seen in Figure 3, the bearing member 36 has a plurality of circumferentially spaced, axially extending grooves 40 and a single annular groove 42. The grooves 40 provide communication of liquid pressure from the manually operated master cylinder 44 to the bore 28, while the annular groove 42 serves to communicate the same fluid pressure to the power unit control valve passage 46.

A piston 48 is reciprocably received in bore 28 and is cup-shaped with its outer closed end (bottom of the cup) provided with a compensating aperture 50. The other end of piston 48 has a radially outwardly flaring flange 52 which constitutes the only portion of piston 48 which engages the wall of bore 28. This flange 52 is preferably formed slightly smaller in diameter than that of bore 28 so that the piston 48 will be capable of a slight wobbling movement for a purpose which will become apparent hereinafter. Flange 52 also serves as a seat for rubber sealing member 54 which prevents the leakage of liquid around piston 48. An annular spring seat 56 may also be provided around the outer periphery of piston 48, spring 58 in bore 28 bearing against this seat 56 and against the opposite end of bore 28 to bias piston 48 to its illustrated released position.

A ball valve 60 is suitably secured in the end of push rod 32 adjacent the piston 48 and when both the diaphragm 12 and piston 48 are in their released positions as shown, said valve 60 will be spaced from opening 50 thereby providing the aforementioned communication of liquid pressure from master cylinder 44 to bore 28 and port 24. The bearing 36 is made to a length which will position piston 48 the required distance from valve 60, flange 52 abutting the adjacent end of this bearing 36.

Thus it is seen that by moving diaphragm 12 to the right, the ball valve 60 will engage and close the compensating port 50 and advance piston 48 to the right, creating hydraulic pressure in the bore 28 which is transmitted to brake 26, If any eccentricities should exist between push rod 32 and the bore 28, the piston 48 will shift from side to side in accordance therewith, thereby maintaining at all times, during the power stroke of piston 48, a positive closure by valve 60 of the port 50.

As is obvious from the description thus far, the piston 48 is of very simple design and may be made by conventional mass production methods such as by stamping or by a screw machine operation. Its design, while being simple, also provides positive and reliable operation even though the reciprocal motion of push rod 32 is slightly eccentric with the axis of bore 28.

A control valve 62, for selectively varying the differential pressure over the diaphragm 12, comprises a valve operating piston 64, constant vacuum chamber 66 and control chamber 68. A conduit 70 connects control chamber 68 with power unit chamber 14. A source of vacuum is connected to chamber 16 of said power unit and vacuum chamber 66 of control valve 62. In released position, vacuum is communicated from chamber 66 through diaphragm opening 72, and conduit 70 to chamber 14, thereby submerging diaphragm 12 in vacuum. By operating the master cylinder 44, liquid pressure is transmitted to valve operating piston 64 which moves to the right to close the opening 72 against valve 74 and to open valve 76 to air at atmospheric pressure which passes through conduit 70 to chamber 14. A pressure differential is thereby created over diaphragm 12 which will force it to the right to operatively engage the piston 48 and advance it in bore 28 to produce the hydraulic pressure for operating brake 26.

Because master cylinder 44 is connected directly to bore 28 by means of aperture 50, there is no need for a compensating reservoir in this construction. During actuation of the power unit, the manually developed pressure acts against the rear of piston 48 to assist the diaphragm 12 in developing brake applying effort.

While it is believed that the operation of this invention is apparent from the foregoing description, a general description of such operation will now be given. Manual operation of master cylinder 44 will force liquid through grooves 40 in bearing member 36 and through port 50 in piston 48 to the bore 28. This same liquid pressure will also be communicated to the control valve 62 which will function to produce a differential air pressure over diaphragm 12 causing it to move to the right carrying with it the push rod 32. After moving a predetermined distance, the ball valve 60 engages and closes port 50 and continued movement of push rod 32 advances piston 48. By releasing the manual pressure exerted on master cylinder 44, the valve operating piston 64 of control valve 62 is permitted to return to its illustrated released position whereby vacuum communication is restored to chamber 14 allowing spring 18 to return diaphragm 12 to its illustrated released position.

Figure 4:
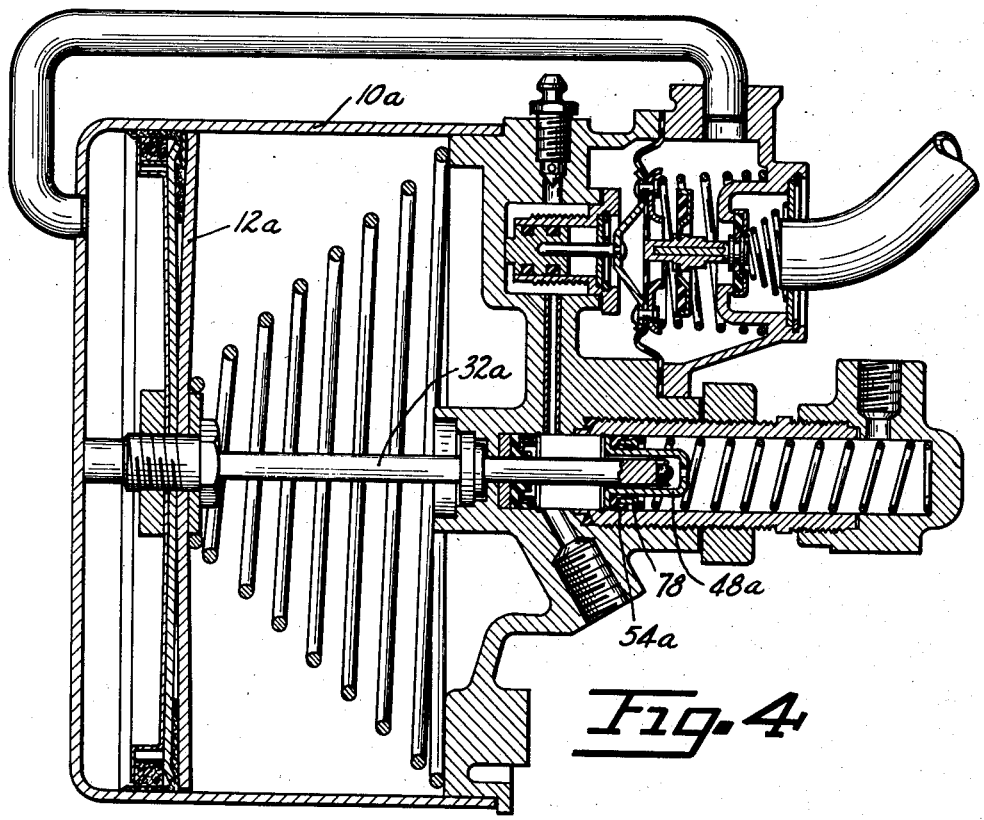
Figure 4 is a longitudinal section of another embodiment of the present invention.

Another embodiment of the present invention is illustrated in Figure 4 in which instead of using a diaphragm 12, a piston 12a, reciprocable in a cylindrical housing 10a, is used. Since the piston 12a serves as a guide for the push rod 32a, it is not necessary to use the comparatively long push rod bearing 36. The piston 48a is substantially identical to that of 48 in Figure 1, with the exception that the annular spring seating flange 56 is not present and a separate piece in the form on an annulus 78 is substituted therefor which surrounds piston 48a to engage the sealing member 54a. The operation of this embodiment is substantially identical to that of Figure 1.

Figure 5:
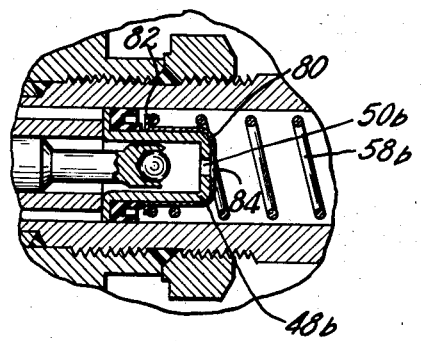
Figure 5 is a fragmental longitudinal section of a slave cylinder piston arrangement different from those of the preceding figures.

Figure 5 constitutes an illustration of still another form of hydraulic slave cylinder piston designated as 48b. This piston is substantially identical to that of 48a of Figure 4 and uses, instead of the annulus 78, a cup-shaped member 80 which fits the head end of piston 48b and is provided with a radially outwardly flaring flange 82 against which the spring 58b seats. This cap 80 is provided with a suitable opening 84 which registers with the port 50b in piston 48b.

The hydraulic slave cylinder pistons 48, 48a, and 48b, having only narrow bearing contacts with the wall of the respective bore 28, are capable of slight wobbling movements which, as stated previously, serve to compensate for any eccentricities between the push rod 32 and the respective bore 28. If the piston 48 were not made so that it could partake of a slight wobbling motion, any eccentricities between the opening 50 and the adjacent end of push rod 32 would result in the ball valve 60 unseating from opening 50, during a pressure stroke of the piston 48, and allow the liquid pressure developed ahead of piston 48 to leak back. With the piston 48 constructed as shown and described, it is obvious that the valve 60 will always completely close the port 50.

Although several embodiments of the invention have been illustrated and described, various changes in the form and relative arrangements of the parts may be made to suit requirements.

I claim:

1. A differential air pressure power unit and hydraulic actuator operated thereby comprising a housing for said power unit, a fluid pressure responsive member dividing said housing into variable volume chambers, an end plate secured to one end of said housing and having an opening therethrough, a hydraulic slave cylinder carried by said end plate and having a bore registering with said opening, a thrust-transmitting-rod secured to said fluid pressure responsive member and projecting through said opening into the bore of said slave cylinder, a sealing member cooperatively associated with said opening to prevent leakage of fluid around said rod between said bore and the interior of said housing, a tubular bearing concentrically positioned inside said bore and slidably receiving said rod therethrough, a plurality of axially extending grooves formed in the outer periphery of said bearing member, said rod carrying a ball valve on its end remote from said fluid pressure responsive member, a cup-shaped piston provided with an aperture in its closed end and having a radially outwardly flaring bearing flange which slidably engages the wall of said bore, a sealing member seated adjacent said flange to prevent the leakage of fluid around said piston, said piston being received over the ball-valve end of said rod whereby said ball valve will engage and close said aperture during protractile movement of said rod, said piston shifting in accordance with any eccentricities between said rod and said bore thereby maintaining said aperture closed for the entire protractile movement of said rod, means urging said fluid pressure responsive member to retracted position, and means urging said piston to retracted position, said piston when retracted engaging said tubular bearing as a stop and said pressure responsive member retracting to a position where said ball valve will be spaced from said aperture to provide fluid communication between said slave cylinder bore and said tubular bearing grooves.

2. A differential air pressure power unit and hydraulic actuator operated thereby comprising a housing for said power unit, a fluid pressure responsive member dividing said housing into variable volume chambers, an opening formed in one end of said housing, a hydraulic slave cylinder carried by said housing and having a bore registering with said opening, a thrust-transmitting-rod secured to said fluid pressure responsive member and projecting through said opening into the bore of said slave cylinder, a tubular bearing positioned inside said bore and slidably receiving said rod therethrough, a plurality of axially extending grooves formed in the outer periphery of said bearing member, said rod having a ball valve mounted on its end remote from said fluid pressure responsive member, a cup-shaped piston provided with an aperture in its closed end and having a radially outwardly flaring bearing flange which slidably engages the wall of said bore, a sealing member seated adjacent said flange to prevent the leakage of fluid around said piston, said piston being received over the ball-valve end of said rod whereby said ball valve will engage and close said aperture during protractile movement of said rod, said piston shifting in accordance with any eccentricities between said rod and said bore, means urging said fluid pressure responsive member to retracted position, and means urging said piston to retracted position, said piston when retracted engaging said bearing as a stop and said pressure responsive member retracting to a position where said ball valve will be spaced from said aperture to provide fluid communication between said slave cylinder bore and said bearing grooves.

3. A differential air pressure power unit and hydraulic actuator operated thereby comprising a housing for said power unit, a fluid pressure responsive member dividing said housing into variable volume chambers, an opening formed in one end of said housing, a hydraulic slave cylinder carried by said housing and having a bore registering with said opening, a thrust-transmitting-rod secured to said fluid pressure responsive member and projecting through said opening into the bore of said slave cylinder, a bearing positioned inside said bore and slidably receiving said rod therethrough, a plurality of axially extending grooves formed in the outer periphery of said bearing, a ball valve carried on the end of said rod remote from said fluid pressure responsive member, and a cup-shaped piston provided with an aperture in its closed end and having a radially outwardly flaring bearing flange which slidably engages the wall of said bore, and a sealing member seated adjacent said flange to prevent the leakage of fluid around said piston, said piston being received over the ball-valve end of said rod whereby said ball valve will engage and close said aperture during protractile movement of said rod, said piston shifting in accordance with any eccentricities between said rod and said bore, said piston and said pressure responsive member retracting to a position where said ball valve will be spaced from said aperture to provide fluid communication between said slave cylinder bore and said bearing grooves.

4. A differential air pressure power unit and hydraulic actuator operated thereby comprising a housing for said power unit, a fluid pressure responsive member dividing said housing into variable volume chambers, an opening formed in one end of said housing, a hydraulic slave cylinder carried by said housing and having a bore registering with said opening, a thrust-transmitting-rod operatively connected to said fluid pressure responsive member and projecting through said opening to be guided thereby into the bore of said slave cylinder, said rod carrying a ball valve on its end remote from said fluid pressure responsive member, a cup-shaped piston provided with an aperture in its closed end and having a radially outwardly flaring bearing flange which slidably engages the wall of said bore, and a sealing member seated adjacent said flange to prevent the leakage of fluid around said piston, said piston being received over the ball-valve end of said rod whereby said ball valve will engage and close said aperture during protractile movement of said rod with said piston shifting in accordance with any eccentricities between said rod and said bore, said piston and said rod when fully retracted being adapted to space said ball valve from said aperture thereby providing for fluid communication between the chambers on each side of said piston.

5. A differential air pressure power unit and hydraulic actuator operated thereby comprising a housing for said power unit having therein a fluid pressure responsive member which defines two variable volume chambers, a hydraulic slave cylinder carried by said housing and having a bore, a thrust-transmitting-member operatively connected to said pressure responsive member and projecting into said bore, a valve element provided on the end of said thrust-transmitting-member which projects into said bore, and a cup-shaped piston provided with an aperture in its closed end and having a radially outwardly flaring bearing flange which slidably engages the wall of said bore, said piston being received over the valve-element end of said thrust-transmitting-member with said valve element being adapted to selectively open and close said aperture, said valve element engaging and closing said aperture during protractile movement of said thrust-transmitting-member with said piston shiftable laterally in said bore in accordance with any eccentricities between said thrust-transmitting-member and said bore, said valve element being unseated from said piston opening when said thrust-transmitting-member and said piston are fully retracted.

6. A differential air pressure power unit and hydraulic actuator operated thereby comprising a housing for said power unit having therein a fluid pressure responsive member which defines two variable volume chambers, a hydraulic slave cylinder carried by said housing and having a bore, a cup-shaped piston provided with an aperture in its closed end and having an annular bearing on its outer periphery, said annular bearing constituting the only portion of said piston which slidably engages the wall of said bore, said piston being capable of wobbling movement in said bore, means operatively connecting said pressure responsive member to said piston, and a valve element carried by said means and engageable with said aperture to close the same when said piston is advanced into said bore in response to the protractile movement of said pressure responsive member.

7. A differential air pressure power unit and hydraulic actuator operated thereby comprising a housing for said power unit, a fluid pressure responsive member dividing said housing into variable volume chambers, an end plate secured to one end of said housing and having an opening therethrough, a hydraulic slave cylinder carried by said end plate and having a bore registering with said opening, a thrust-transmitting-rod secured to said fluid pressure responsive member and projecting through said opening into the bore of said slave cylinder, a sealing member cooperatively associated with said opening to prevent leakage of fluid around said rod between said bore and the interior of said housing, a tubular bearing positioned inside said bore and slidably receiving said rod therethrough, a plurality of axially extending grooves formed in the outer periphery of said bearing member, said rod having a ball valve mounted on its end remote from said fluid pressure responsive member, a cup-shaped piston provided with an aperture in its closed end and having a radially outwardly flaring bearing flange which slidably engages the wall of said bore, a sealing member seated adjacent said flange to prevent the leakage of fluid around said piston, said piston being received over the ball-valve end of said rod whereby said ball valve will engage and close said aperture during protractile movement of said rod, said piston shifting in accordance with any eccentricities between said rod and said bore thereby maintaining said aperture closed for the entire protractile movement of said rod, spring means urging said fluid pressure responsive member to retracted position, and spring means urging said piston to retracted position, said piston when retracted engaging said tubular bearing as a stop and said pressure responsive member retracting to a position where said ball valve will be spaced from said aperture to provide fluid communication between said slave cylinder bore and said tubular bearing grooves.

8. A differential air pressure power unit and hydraulic actuator operated thereby comprising a housing for said power unit, a fluid pressure responsive member dividing said housing into variable volume chambers, an opening formed in one end of said housing, a hydraulic slave cylinder carried by said housing and having a bore in registry with said opening, a thrust-transmitting-rod secured to said fluid pressure responsive member and projecting through said opening into the bore of said slave cylinder, a tubular bearing positioned inside said bore and slidably receiving said rod therethrough, a plurality of axially extending grooves formed in the outer periphery of said bearing member, said rod having a ball valve secured to its end remote from said fluid pressure responsive member, a cup-shaped piston provided with an aperture in its closed end and having a radially outwardly flaring bearing flange which slidably engages the wall of said bore, said piston being received over the ball-valve end of said rod whereby said ball valve will engage and close said aperture during protractile movement of said rod, said piston shifting in accordance with any eccentricities between said rod and said bore, and spring means urging said piston to retracted position, said piston when retracted engaging said bearing as a stop and said pressure responsive member retracting to a position where said ball valve will be spaced from said aperture to provide fluid communication between said slave cylinder bore and said bearing grooves.

9. A differential air pressure power unit and hydraulic actuator operated thereby comprising a housing for said power unit, a fluid pressure responsive member dividing said housing into variable volume chambers, an opening formed in one end of said housing, a hydraulic slave cylinder carried by said housing and having a bore in registry with said opening, a thrust-transmitting-rod secured to said fluid pressure responsive member and projecting through said opening into the bore of said slave cylinder, a bearing positioned inside said bore and slidably receiving said rod therethrough, a plurality of axially extending grooves formed in the outer periphery of said bearing, said rod having a ball valve secured to its end remote from said fluid pressure responsive member, and a cup-shaped piston provided with an aperture in its closed end and having a radially outwardly flaring bearing flange which slidably engages the wall of said bore, said piston being received over the ball-valve end of said rod whereby said ball-valve will engage and close said aperture during protractile movement of said rod, said piston shifting in accordance with any eccentricities between said rod and said bore, said piston and said pressure responsive member retracting to a position where said ball valve will be spaced from said aperture to provide fluid communication between said slave cylinder bore and said bearing grooves.

10. A differential air pressure power unit and hydraulic actuator operated thereby comprising a housing for said power unit, a fluid pressure responsive member dividing said housing into variable volume chambers, an opening formed in one end of said housing, a hydraulic slave cylinder carried by said housing and having a bore in registry with said opening, a thrust-transmitting-rod secured to said fluid pressure responsive member and projecting through said opening into the bore of said slave cylinder, a bearing positioned inside said bore and slidably receiving said rod therethrough, a plurality of axially extending grooves formed in the outer periphery of said bearing, said rod having a valve element on its end remote from said fluid pressure responsive member, and a cup-shaped piston provided with an aperture in its closed end and having a radially outwardly flaring bearing flange which slidably engages the wall of said bore, said piston being received over the valve end of said rod whereby said valve element will engage and close said aperture during protractile movement of said rod, said piston shifting in accordance with any eccentricities between said rod and said bore, said piston when retracted engaging said bearing as a stop and said pressure responsive member retracting to a position where said valve element will be spaced from said aperture to provide fluid communication between said slave cylinder bore and said bearing grooves.

11. A differential air pressure power device comprising a power chamber having a fluid pressure responsive member therein, an opening formed in one end of said chamber, a slave cylinder carried by said chamber and having a bore which registers with said opening, a thrust-transmitting member operatively connected to said fluid pressure responsive member and projecting through said opening into the bore of said slave cylinder, a bearing member positioned inside said bore and slidably receiving said thrust-transmitting member therethrough, a plurality of grooves provided in the outer peripheral portion of said bearing member, said grooves extending in the direction of the axis of said bore, said thrust-transmitting member having a valve element on its end remote from said power chamber, and a cup-shaped piston provided with an aperture in its closed end and having a radially outwardly flaring bearing flange which slidably engages the wall of said bore, said piston being received over the valve end of said thrust-transmitting member whereby said valve element will engage and close said aperture during protractile movement of said thrust-transmitting member, said piston shifting in accordance with any eccentricities between said thrust-transmitting member and said bore, said piston when retracted engaging said bearing member as a stop and said pressure responsive member retracting to a position where said valve element will be spaced from said aperture to provide fluid communication between said slave cylinder bore and said bearing grooves.

12. In a differential fluid pressure power device, a hydraulic cylinder having a bore, a thrust-transmitting rod reciprocably projecting into said bore, said rod having a ball valve mounted on one of its ends, a cup-shaped piston provided with an aperture in its closed end and having a radially outwardly extending bearing flange which slidably engages the wall of said bore, said piston being received over the ball-valve end of said rod whereby said ball-valve will engage and close said aperture during protractile movement of said rod, said bearing flange serving as the trailing portion of said piston during the aforesaid protractile movement thereby permitting said piston to shift during said movement in accordance with any eccentricities between said rod and said bore, said piston and said rod when fully retracted being adapted to space said ball from said aperture.

13. In a differential fluid pressure power device, a hydraulic cylinder having a bore, a thrust-transmitting rod reciprocably projecting into said bore, said rod having a valve element mounted on one of its ends, a cup-shaped piston provided with an aperture in its closed end and having a radially outwardly extending bearing flange which slidably engages the wall of said bore, said piston being received over the valve end of said rod whereby said valve element will engage and close said aperture during protractile movement of said rod, said bearing flange serving as the trailing portion of said piston during the aforesaid protractile movement thereby permitting said piston to shift during said movement in accordance with any eccentricities between said rod and said bore, said piston and said rod when fully retracted being adapted to space said valve element from said aperture.

14. In a differential air pressure power device, a hydraulic cylinder having a bore, a cup-shaped piston provided with an aperture in its closed end and having an annular trailing bearing on its outer periphery, said annular bearing constituting the only portion of said piston which slidably engages the wall of said bore, means for actuating said piston, and a valve element carried by said means and engageable with said aperture to close the same and to move said piston on its actuating stroke, the engagement between said valve element and said piston being such as to allow said piston to adjust itself in said bore for any eccentricities between said means and said bore.

15. In a hydraulic pressure system, a hydraulic cylinder having a bore therein, a piston reciprocable in said bore and having an annular bearing on its outer periphery which permits the piston to wobble when moving in the bore, means connecting the piston to a power source, said piston having a valve port through which hydraulic fluid may flow, and a valve member carried by said means and adapted to effect closure of said opening during movement of said piston in a direction to displace fluid in said bore.

16. In a hydraulic pressure system, a hydraulic cylinder having a bore therein, a piston reciprocable in said bore, said piston being of generally cup-shaped contour and having a valve port in the closed end thereof, the outer periphery of the piston having an annular bearing which permits the piston to wobble when moving in the bore, and means connecting the piston to an actuating source including a member which projects into the piston and carries a valve element adapted to effect closure of said port when the member and piston are moved in a direction to displace fluid in said bore.

EARL R. PRICE.

References Cited in the file of this patent

UNITED STATES PATENTS

| Number | Name | Date |
|---|---|---|
| 2,308,956 | Hatch | Jan. 19, 1943 |
| 2,336,374 | Stelzer | Dec. 7, 1943 |
| 2,352,920 | Stevens | July 4, 1944 |
| 2,393,524 | Fant | Jan. 22, 1946 |
| 2,526,236 | Ingres | Oct. 17, 1950 |
| 2,541,312 | Vogel | Feb. 13, 1951 |